United States Patent
Nichols et al.

(10) Patent No.: US 7,519,634 B2
(45) Date of Patent: Apr. 14, 2009

(54) SYSTEM AND METHOD FOR PRESERVING MEMORY RESOURCES DURING DATA BACKUP

(75) Inventors: Charles Alan Nichols, Tucson, AZ (US); Thomas Franklin Ramke, Jr., Vonore, TN (US); Jack Earl Steitz, Los Gatos, CA (US); Peter Tanenhaus, Vestal, NY (US); John Viksne, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 11/566,516

(22) Filed: Dec. 4, 2006

(65) Prior Publication Data

US 2008/0133619 A1 Jun. 5, 2008

(51) Int. Cl.
*G06F 17/30* (2006.01)
(52) U.S. Cl. ........................................ 707/204; 711/113
(58) Field of Classification Search ........................ None
See application file for complete search history.

(56) References Cited

U.S. PATENT DOCUMENTS

2002/0107877 A1* 8/2002 Whiting et al. ............. 707/204
2007/0225962 A1* 9/2007 Brunet et al. ................. 703/23

* cited by examiner

*Primary Examiner*—Luke S. Wassum
*Assistant Examiner*—Noosha Arjomandi
(74) *Attorney, Agent, or Firm*—Kunzler & McKenzie

(57) ABSTRACT

A system and method to efficiently back up files while preserving memory resources. The system includes a generation module to generate an unordered list of backup files and associated attributes, and a processing module to back up local files one at a time by modifying the backup files to reflect changes to the local files. The processing module may include a retrieval module to retrieve local file attribute information from the hard disk, a comparator module to compare the local file attributes to corresponding backup file information on the list, and an update module to update the corresponding backup file to reflect any differences. In this manner, the present invention avoids processing limitations caused by insufficient memory and/or excessive quantities of local files.

2 Claims, 3 Drawing Sheets

SYSTEM AND METHOD FOR PRESERVING MEMORY RESOURCES DURING DATA BACKUP

BACKGROUND OF THE INVENTION

1. Field of the Invention

The invention relates to systems and methods for backing up data. Specifically, the invention relates to systems and methods to preserve memory resources during backup to facilitate large scale data backup.

2. Description of the Related Art

Recent advances in disk storage have made it possible to store increasingly large numbers of files on a computer at minimal expense. As a result, simplistic data management systems, while adequate to manage and protect smaller quantities of data, may fall short where large scale data management is required.

Traditionally, for example, a file attribute bit, or archive bit, has been used to indicate whether a local file has undergone a data change since a previous data management operation. The archive bit, however, is vulnerable to corruption by other user processes, thereby compromising its reliability. Moreover, the archive bit fails to take into account server conditions that may require a local file to be backed up, such as damage to or deletion of a backup file.

In response to these shortcomings, modern data management systems have implemented incremental backup systems utilizing complex file attribute information to identify and differentiate between various types of data changes on the local system, as well as on the server. Incremental backup methods effectively reduce an amount of data sent to the server for backup and therefore save both network bandwidth and server storage space.

Tivoli Storage Manager® data management system, for example, protects an organization's data by storing file attribute information in a central repository. File attribute information may include, for example, update and creation time, date, size, access control lists ("ACL"), and extended information such as mode information, sizes and checksums of relative data streams, and the like. A storage management client application scans the local file system to generate a list of file names and their associated attributes, and then compares the list with the list stored in the central repository. This comparison identifies: (1) new files present on the local file system that are not present in the central repository; (2) deleted files present in the central repository that are not present on the local file system; and (3) changed files having a different set of attributes in the local file system than in the central repository.

While this information effectively streamlines data management operations and increases back up process reliability, it can also require huge amounts of memory and time. Typically, in fact, many gigabytes of memory are needed to represent files in a local or central repository file list. For large scale data backup, the amount of memory needed to accomplish a comparison of file lists may easily exceed the amount of real or virtual memory available for such an operation. Moreover, the amount of time required to scan for files stored locally and in the central repository to create file lists for comparison can exceed available time.

Other prior art data management systems have attempted solutions to these problems by, for example, breaking up logical file systems into smaller logical file systems, extending the amount of virtual memory available, processing entries from a server one directory at a time, and/or journaling changes to data on the local system. Each such system, however, suffers from individual shortcomings. Particularly, breaking up logical file systems into multiple logical file systems may be unattractive to customers that inherit large file systems due to server or information technology consolidation processes. Extending an amount of virtual memory available only postpones the problem of insufficient memory. Processing entries from a server one directory at a time may nevertheless deplete memory and time resources where large quanitites of files are stored within a single directory. Journaling systems are not compatible with all client platforms, and may be unreliable, requiring reconciliation with a central repository to ensure their accuracy.

SUMMARY OF THE INVENTION

From the foregoing discussion, it should be understood that a need exists for a system and method to preserve memory resources during data backup. Beneficially, such a system and method would facilitate large scale data backup while promoting efficient data management. Such a system and method are disclosed and claimed herein.

A system for preserving memory resources during data backup in accordance with the present invention may include a computer and a server, a generation module, and a processing module. The computer may include memory and a hard disk, and may store local files on the hard disk. The server may store backup files corresponding to a prior backup of the local files.

The generation module may generate an unordered, randomly accessible list of backup files and associated attributes from the server. The processing module may then back up the local files one at a time by modifying the backup files to reflect changes to the local files since a previous backup operation.

In some embodiments, the processing module may include a retrieval module, a comparator module, and an update module. The retrieval module may retrieve from the hard disk local file attributes corresponding to a local file. Local file attributes may include creation date, creation time, modification date, modification time, file size, access control lists, and/or extended attributes. The comparator module may then compare the local file attributes to corresponding backup file information on the list to identify differences between the local file and the corresponding backup file. The update module may then update the corresponding backup file to reflect the differences.

In other embodiments, the system may further include a marcation module and an expiration module. The marcation module may mark the list to indicate a match between corresponding backup file information and the local file attributes. The expiration module may expire all unmarked backup files from the server.

A method of the present invention is also presented for preserving memory resources during data backup. In one embodiment, the method includes accessing backup files on a server, where the backup files correspond to a prior backup of local files stored on a hard disk of a computer. The method further includes generating an unordered, randomly accessible list of the backup files and associated attributes, and processing the local files, one at a time, by modifying the backup files to reflect changes to the local files.

As in the system, the processing step may include retrieving local file attributes corresponding to a local file stored on the hard disk, comparing the local file attributes to corresponding backup file information on the list to identify differences between the local file and a corresponding backup file, and updating the corresponding backup file to reflect the differences. Also, in some embodiments, the method may include marking the list to indicate a match between the corresponding backup file information and the local file attributes, and expiring unmarked backup files from the server.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
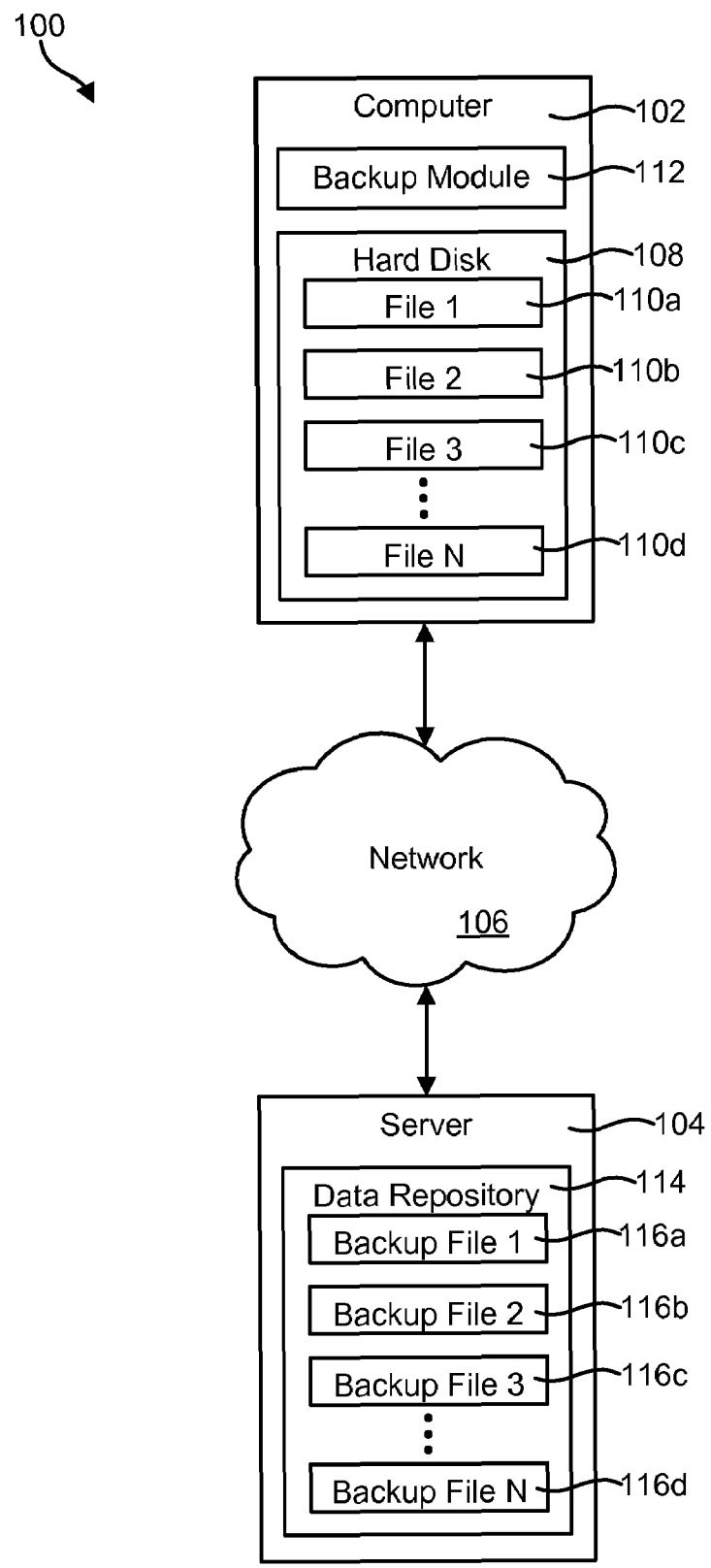
FIG. 1 is a schematic block diagram illustrating backup system structures utilized in connection with embodiments of the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

As used in this specification, the term "backup" or "data backup operation" refers to a process of copying data from a primary storage location to a secondary storage location to enable restoration of the data in case of disaster, corruption, deletion, or other data loss event.

Referring now to FIG. 1, a system 100 to preserve memory resources during data backup in accordance with the present invention may comprise a computing device 102 communicating with a server 104 over a network 106. The network 106 may comprise, for example, a local area network ("LAN"), a wide area network ("WAN"), the World Wide Web, or any other network known to those in the art. The computing device 102 may include a desktop computer, a laptop computer, a personal digital assistant ("PDA"), a cell phone, or any other computing device known to those in the art. The computing device 102 may include a hard disk 108 storing local files 110a, 110b, 110c, 110d. The computing device 102 may further include a backup module 112, discussed in more detail with reference to FIG. 2 below.

The server 104 may store backup files 116a, 116b, 116c, 116d in a data repository 114. The backup files 116a, 116b, 116c, 116d may correspond to a prior backup of the local files 110a, 110b, 110c, 110d. Specifically, a first backup file 116a may correspond to a prior backup of a first local file 110a, a second backup file 116b may correspond to a prior backup of a second local file 110b, and so forth.

Figure 2:
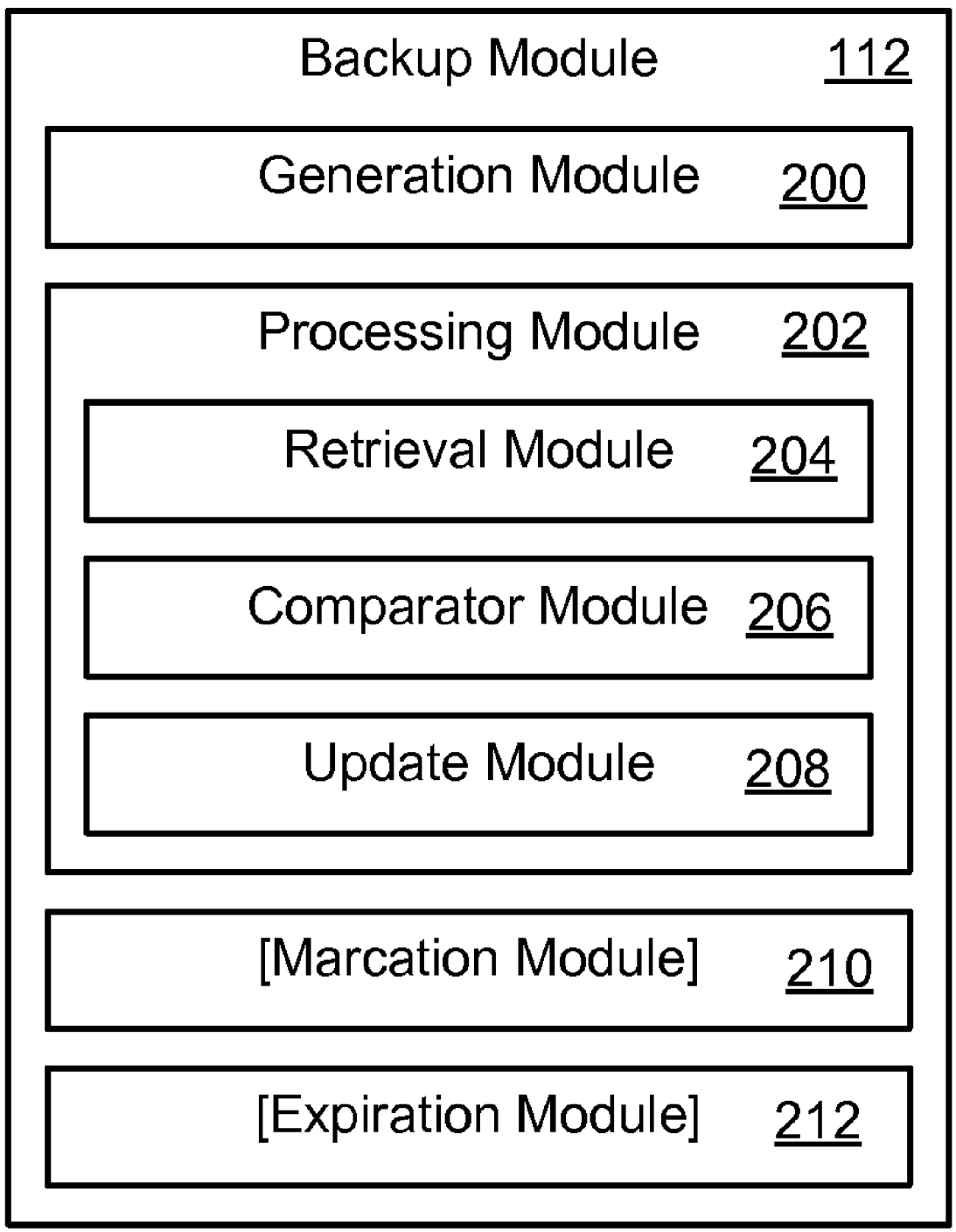
FIG. 2 is a block diagram illustrating modules for backing up data in accordance with the present invention.

Referring now to FIG. 2, a backup module 112 in accordance with the present invention may include a generation module 200 to generate a list of the backup files 116 and associated information. Specifically, the generation module 200 may scan the data repository 114 of the server 104 to generate an unordered, randomly accessible list of file names and attributes associated with each of the backup files 116. Attributes may include, for example, update and creation time, date, size, access control lists ("ACL"), and/or extended attributes such as mode information, sizes and checksums of relative data streams, and the like. The list generated by the generation module 200 may be unordered, as the present invention does not demand an ordered arrangement of the file names and attributes associated with each of the backup files 116 for backup purposes. The generation module 200 may store the list, or portion thereof, in memory, on the hard disk, or both.

A processing module 202 may process each local file 110 with reference to the list generated by the generation module 200. Such processing, however, may occur without regard to an order of backup file 116 information as contained on the list. Indeed, the processing module may back up the local files in any order, as defined by the operating system.

Specifically, the processing module 202 may back up, one at a time, the local files 110 by modifying the backup files 116 to reflect changes to the local files 110. By individually processing each local file 110, the present invention avoids dependence on limited memory resources and may thus perform large scale data backup efficiently and effectively. Memory usage may be further alleviated by storing at least a portion of the list of backup file 116 information in memory, on hard disk, or both, as discussed above with reference to the generation module 200.

The processing module 202 may include a retrieval module 204, a comparator module 206, and an update module 208. The retrieval module 204 may randomly retrieve local file 110 attribute information from the hard disk 108. The comparator module 206 may associate the local file 110 attributes with information on the list corresponding to a particular backup file 116. The comparator module 206 may then compare the local file 110 attributes to the corresponding backup file 116 information to identify differences between the local file 110 and the backup file 116. The update module 208 may then update the corresponding backup file 116 to reflect the differences. In certain embodiments, the processing module 202 may iteratively process local files 110 in this manner, randomly, one at a time, to complete a data backup operation of all local files 110.

In certain embodiments, a system 100 in accordance with the present invention may further include a marcation module 210 and an expiration module 212 to ensure congruence between the backup files 116 and the local files 110. The marcation module 210 may mark the list to indicate a match between certain backup file 116 information on the list and a local file 110. The marcation module 210 may iteratively mark the list as each local file 110 is processed. The expiration module 212 may then expire unmarked backup files 116 from the server 104, thereby ensuring efficient use of resources by avoiding continued maintenance of obsolete files.

Figure 3:
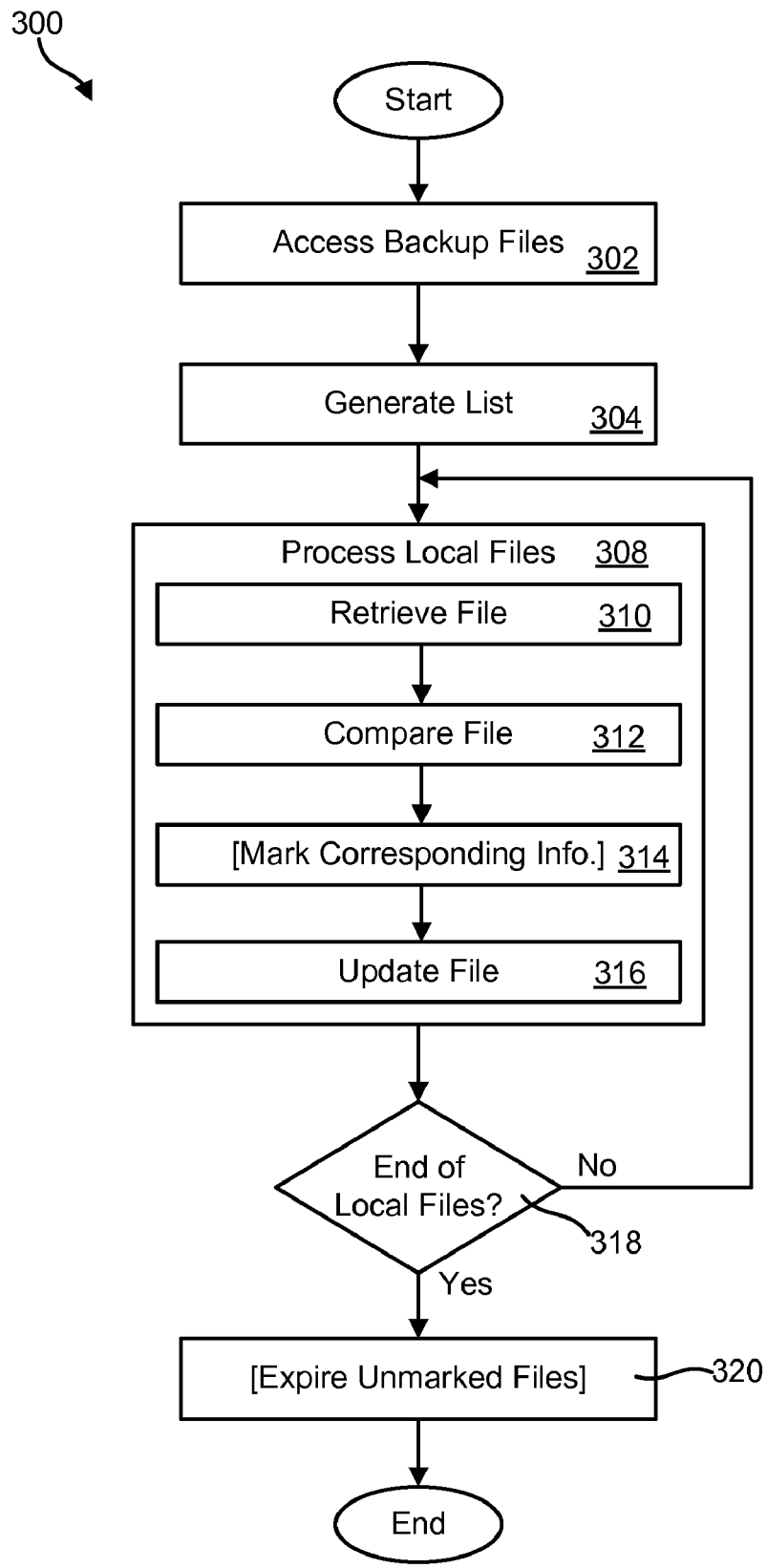
FIG. 3 is a flow chart of a process for backing up data in accordance with certain embodiments of the present invention.

Referring now to FIG. 3, a method 300 to preserve memory resources during data backup in accordance with the present invention may proceed by first accessing 302 backup files 116 stored on a server 104. The backup files 116 may correspond to a prior backup of local files 110 stored on a hard disk 108 of a computer 102. The method 300 may further include generating 304 an unordered, randomly accessible list of the backup files 116 and their associated attributes, such as file name, update and creation time, date, size, access control lists ("ACL"), and/or extended attributes such as mode, information, sizes and checksums of relative data streams, and the like.

A next step of the method 300 may include processing 308 each of the local files 110, one at a time, by modifying the backup files 116 to reflect changes to the local files 110. Processing 308 may include retrieving 310 local file 110 attributes from the hard disk 108, comparing 312 the local file 110 attributes to corresponding backup file 116 information on the list to identify differences between the local file 110 and a corresponding backup file 116, and updating 316 the corresponding backup file 116 to reflect the differences. Again, retrieving 310 local file 110 attributes and comparing 312 the local file 110 attributes to corresponding backup file 116 information may occur substantially randomly, as the present invention requires neither ordered lists of backup file 116 information nor ordered retrieval of local file 110 attributes. In some embodiments, the method 300 may test 318 for additional local files 110 after processing 308. If additional local files 110 exist, the processing 308 step may repeat with another local file 110. Otherwise, the method 300 may end.

In one embodiment, the method 300 may further include marking 314 the list to indicate a match between the corresponding backup file 116 information and the local file 110. In this embodiment, the method 300 may also include expiring 320 unmarked backup files 116 from the server 104. In this manner, the method 300 ensures that backup files 116 corresponding to local files 110 that have been purged from the computer 102 are similarly purged from the server 104.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to preserve memory resources during data backup, comprising:

a computer having memory and a hard disk, the computer storing local files on the hard disk;

a server storing backup files corresponding to a prior backup of the local files;

a generation module to access the server and generate an unordered list of the backup files and associated attributes from the server, the attributes comprising file name, creation date, creation time, modification date, modification time, file size, access control lists, and checksums of relative data streams; and a processing module to back up, one at a time, the local files of the list by modifying the backup files to reflect changes to the local files, the processing module comprising:
 a retrieval module to retrieve, from the hard disk, local file attributes corresponding to a local file;
 a comparator module to compare the local file attributes to corresponding backup file information on the list to identify differences between the local file and a corresponding backup file;
 an update module to update the corresponding backup file to reflect the differences;
 a marcation module to mark the list to indicate a match between the corresponding backup file information and the local file attributes; and
 an expiration module to expire unmarked backup files from the server.

2. A method to preserve memory resources during data backup, comprising:
 accessing backup files on a server, the backup files corresponding to a prior backup of local files stored on a hard disk of a computer;
 generating an unordered list of the backup files and associated attributes, the attributes comprising file name, creation date, creation time, modification date, modification time, file size, access control lists, and checksums of relative data streams; and
 processing, one at a time, the local files of the list by modifying the backup files to reflect changes to the local files, wherein processing comprises:
  retrieving, from the hard disk, local file attributes corresponding to a local file;
  comparing the local file attributes to corresponding backup file information on the list to identify differences between the local file and a corresponding backup file;
  updating the corresponding backup file to reflect the differences;
  marking the list to indicate a match between the corresponding backup file information and the local file attributes; and
  expiring unmarked backup files from the server.

* * * * *